United States Patent [19]

Shadman

[11] Patent Number: 5,196,380
[45] Date of Patent: Mar. 23, 1993

[54] REACTIVE MEMBRANE FOR FILTRATION AND PURIFICATION OF GASES OF IMPURITIES

[75] Inventor: Farhang F. Shadman, Tucson, Ariz.

[73] Assignee: Arizona Board of Reagents, Tucson, Ariz.

[21] Appl. No.: 710,719

[22] Filed: Jun. 6, 1991

[51] Int. Cl.$^5$ .................. B01J 20/20; B01J 20/08; B01J 20/28; B01D 39/00

[52] U.S. Cl. .................. 502/4; 55/16; 55/158; 210/500.25; 264/29.5; 423/219; 423/245.1; 427/249; 502/34; 502/56; 502/413; 502/415; 502/416; 502/417; 502/438

[58] Field of Search .......... 502/4, 413, 415, 416, 502/417; 55/158; 427/245, 249, 255, 255.7; 210/500.25, 500.21; 264/29.5

[56] References Cited

U.S. PATENT DOCUMENTS

| | | | |
|---|---|---|---|
| 3,288,615 | 9/1964 | Estes et al. | 106/40 |
| 4,177,142 | 12/1979 | Halbfoster | 210/75 |
| 4,242,226 | 12/1980 | Siren | 55/74 |
| 4,344,775 | 8/1982 | Klein | 55/75 |
| 4,680,221 | 7/1987 | Murayama et al. | 428/246 |
| 4,685,940 | 8/1987 | Soffer | 55/158 |
| 4,782,226 | 11/1988 | Jeffries, Jr. et al. | 250/227 |
| 4,789,386 | 12/1988 | Vaughn et al. | 55/158 |
| 4,855,276 | 8/1989 | Osborne et al. | 502/417 |
| 4,921,823 | 5/1990 | Furneaux et al. | 502/4 |
| 4,938,785 | 7/1990 | MacPherson et al. | 55/277 |
| 4,946,592 | 8/1990 | Galaj et al. | 210/500.25 |
| 5,037,791 | 8/1991 | Comolli et al. | 502/413 |

FOREIGN PATENT DOCUMENTS

| | | | |
|---|---|---|---|
| 2251351 | 7/1975 | France | 210/506 |
| 59-102419 | 6/1984 | Japan | 210/506 |
| 2201355 | 9/1988 | United Kingdom . | |

OTHER PUBLICATIONS

A. F. M. Leenaars, K. Keizer, A. J. Burggraaf, Journal of Materials Science, 1984, pp. 1077-1088, The Preparation and Characterization of Alumina Membranes With Ultrafine Pores.

A. F. M. Leenaars, K. Keizer, A. J. Burggraaf, Chemtech, Sep. 1986, pp. 560-563 Porous Alumina Membranes.

*Primary Examiner*—Paul E. Konopka
*Attorney, Agent, or Firm*—Bell, Seltzer, Park & Gibson

[57] ABSTRACT

A reactive membrane for simultaneous removal of heterogeneous and homogeneous impurities such as moisture, oxygen and organic compounds from gases is provided. The membrane comprises a substrate layer having a plurality of pores therein, at least one layer of carbon on the porous substrate layer and coating the pores thereof, and at least one reactive layer of a metal in reduced form capable of reacting with the impurities and chemically bonded to the carbon layer. A method of forming the same is also provided.

10 Claims, No Drawings

REACTIVE MEMBRANE FOR FILTRATION AND PURIFICATION OF GASES OF IMPURITIES

FIELD OF THE INVENTION

This invention relates to a membrane, and more particularly to a membrane and a method of filtering and purifying gases of impurities.

BACKGROUND OF THE INVENTION

In order to manufacture advanced materials such as semiconductor devices, trace impurities on the parts per million (ppm) to parts per billion level (ppb) and even sub-ppb levels in any of the manufacturing constituents must be substantially avoided. For example, in manufacturing semiconductor devices, impurities (e.g., moisture, oxygen and organic compounds) in process gases adsorb on the semiconductor wafer, degrade its performance, and lower the manufacturing yield and device reliability.

There are generally two types of impurities in process gases: heterogeneous (e.g., particles and macromolecules) and homogeneous (e.g., dissolved particles). Typically, heterogeneous impurities are removed by filtration and homogeneous impurities are removed by purification. There has been particular interest in the removal of homogeneous impurities from process gases.

There are various commercial purification techniques and purifiers which work by physical adsorption of impurities or by catalytic conversion of impurities to other forms which can be adsorbed. Another exemplary purification technique is a packed bed of particles of a gatter material. Exemplary getter materials include various resins (e.g., Nanochem ® resins) and various alloys (e.g., Zr-V-Fe alloys). For purification, the gas stream passes through these packed beds and the impurities react with the getter material. Although these membranes filter on the ppm level, the membranes often do not effectively filter trace homogeneous impurities on the ppb level. Moreover, these membranes tend to be ineffective when there is an abrupt surge in the impurity level due to the inefficiency of the membranes in bringing impurity molecules in contact with the resins or alloy. Additionally, these membranes tend to generate heterogeneous impurities because of mechanical motion and attrition of particles of the getter material. These membranes also are typically not reusable and often cannot be regenerated.

Additionally, the use of porous ceramics for filtration of particles are known. For example, U.K. Patent No. 2,021,355 to Dahlquist et al proposes a porous membrane for separating heterogeneous impurities from an aqueous medium. The porous membrane comprises an outer support matrix having through-passages and an inner layer lining the through-passages and deposited on the outer support. The support matrix can be a polymer, metal or ceramic. The inner layer can be a matrix of particles of aluminum hydroxide, partially hydrated aluminum oxide, silicon dioxide or zirconium dioxide. French Patent No. 2,251,351 proposes a microporous ceramic filter comprising a microporous ceramic support electrophorethically coated with an oxide of Al, Si, Mg, Ti, Cr, Ni, Zr or Fe. U.S. Pat. No. 3,288,615 to Estes et al proposes a ceramic filter body comprising a framework of one or more tectosilicates with a mineral species (e.g., aluminates and oxides) distributed throughout and filing the framework.

SUMMARY OF THE INVENTION

It is therefore an object of the present invention to provide a reactive membrane and a method utilizing the same.

It is another object of the invention to provide a reactive membrane and method for filtering and purifying gases of heterogeneous and homogeneous impurities such as unwanted gases, moisture and organic compounds.

It is yet another object of the invention to provide a reactive membrane and method for filtering and purifying gases of ppm to ppb levels of heterogeneous and homogeneous impurities.

It is still another object of the invention to provide a reactive membrane which can be reused by regenerating the membrane.

These and other objects are provided according to the present invention by a reactive membrane comprising a substrate layer having a plurality of pores therein (e.g., a "porous" substrate layer), at least one layer of carbon deposited on the substrate layer and coating the pores thereof, and at least one reactive layer of a metal in reduced form capable of reacting with impurities and chemically bonded to the carbon layer.

The present reactive membrane is unlike existing filtration and purification membranes in that in addition to the typical filtration of heterogeneous impurities (e.g., particles and macromolecules), the reactive layer of the membrane is capable of reacting with trace impurities (i.e., ppb or sub-ppb levels of homogeneous impurities such as unwanted gases, moisture and organic compounds). Although applicant does not wish to be bound by any theory, it is thought that substantially all of the impurity molecules come in contact with the molecules of the reactive layer, react, and are removed by the membrane from the gas being filtered and purified. Additionally, such filtration of heterogeneous impurities and purification of homogeneous impurities occurs substantially simultaneously.

The present reactive membrane is formed by first forming at least one layer of carbon on the substrate layer to coat the plurality of pores thereof, preferably using a chemical vapor deposition (CVD) technique and preferably to cover substantially the entire surface area of the porous substrate layer. Then at least one reactive layer of the metal in reduced form is chemically bonded to the carbon layer.

In operation, a stream of the gas to be filtered and purified is passed through the membrane. The heterogeneous impurities are filtered primarily by the porous substrate layer, while substantially simultaneously the trace homogeneous impurities are removed by reacting with the reactive layer. After use, the membrane can be regenerated by reactivating the reactive layer, particularly by heating the membrane to greater than about 300° C. under an inert atmosphere. The regenerated membrane can then be reused.

DESCRIPTION OF A PREFERRED EMBODIMENT

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

The present invention is a reactive membrane for filtering and purifying gases of impurities. The reactive membrane generally comprises a substrate layer having a plurality of pores, preferably a porous ceramic substrate layer, at least one layer of carbon deposited on the substrate layer and coating the pores thereof, and at least one reactive layer of a metal in reduced form capable of reacting with the impurities and chemically bonded to the carbon layer. The membrane is formed by forming at least one layer of carbon on the substrate layer and coating the pores thereof, and chemically bonding at least one reactive layer to the carbon layer. The membrane can be regenerated after use by heating the membrane to greater than about 300° C., and preferably greater than about 500° C. in an inert atmosphere (e.g., nitrogen, argon, helium and the like).

The substrate layer has a plurality of pores (i.e., it is preferably has an initial pore size of about 500 Å), and is formed of a porous ceramic material or porous carbon. The porous substrate layer is also resistant to temperatures greater than 300° C., and preferably temperatures greater than 500° C. to permit the membrane to be regenerated after use. Any of the commercially available porous membranes such as those formed from ceramic materials such as alumina, zirconia, titania, and the like are suitable. An exemplary porous ceramic membrane is sold under the trademark Membralox ® by Alcoa of Warrendale, Pa. Membralox ® is an α-alumina membrane coated with a monolayer of γ-alumina and is available in variety of pore sizes. Exemplary configurations of the substrate and the membrane can include a bundle of ceramic tubes in a shell or a wall flow monolithic geometry. The porous substrate layer is effective in removing heterogeneous impurities (i.e., particles and macromolecules) from the gas being filtered and purified.

A carbon layer is preferably deposited on the porous substrate layer as one or more monolayers having a thickness of about 20 Å to about 100 Å. The porous substrate layer is typically degassed to remove any preexisting impurities in the porous substrate layer. The carbon layer preferably is deposited over and coats substantially the entire surface area of the ceramic substrate layer and reduces the pore size of the substrate layer to about 50 Å to about 100 Å. An exemplary technique for accomplishing this is a CVD technique via the disproportionation of carbon monoxide (CO) or dissociation of other carbon sources such as various hydrocarbons. The deposition can occur under various reaction times and temperatures, and gas compositions, the control of which being within the skill of one in the art. For example if CO is used, the disproportionation can be conducted at a temperature above about 250° C. and preferably about 280° C. using a gas mixture of about 5 to 15 percent by volume CO, 1 to 5 percent by volume $CO_2$ and the remainder a relatively inert gas such as nitrogen. The thickness and amount of carbon can be controlled by adjusting the reaction time, temperature and gas composition.

The reactive layer is metal bonded to carbon in reduced form capable of reacting with the impurities of the gas stream. The term "in reduced form" relates to the oxidation state of the metal in that the oxygen is present in less than the stoichiometric amount in the metal oxide. Exemplary metals include manganese, and the alkali metals such as lithium, sodium and potassium. The reactive layer is deposited using a CVD technique, namely forming a vapor of the metal to be deposited is formed, and the metal is deposited on the layer of carbon deposited on the porous substrate layer. Preferably, the vapor is generated from the hydroxide or oxide of the metal. The temperature for deposition depends on the metal and its typically greater than about 300° C. Alternately, metals can be deposited from a solution of metal-bearing compounds like metal hydroxides onto the substrate by solution impregnation. For example if manganese is used, a solution of manganese oxalate is suitable for this purpose.

The reactive layer is chemically bonded to the carbon layer by formation of an active group between the carbon and the metal. Typically, this is accomplished by heating the substrate layer to greater than about 300° C., and preferably about 380° C. to about 400° C. in an inert atmosphere such as nitrogen, argon, helium, and the like. The inert atmosphere is used to avoid any impurities in the atmosphere which could adversely affect the filtering purification capabilities of the membrane. The metal is deposited as a hydroxide or oxide and reacts with the carbon to form active sites on the substrate. The metal active sites can exist in the reduced form (C-M), as an adsorbed metal, as a metal suboxide, or in oxidized form ($CO_xM$), with the removal of the oxygen necessary to have the preferred highly reactive reduced form. This chemical bond anchors the reactive metal to the carbon and the carbon is anchored to the substrate thus, metal or carbon contamination of the gas stream during filtration/purification is avoided.

In an alternate embodiment, several layers of different metals can be deposited sequentially or mixed together to permit removal of selective impurities as the gas passes through each of the layers of the filter membrane.

In operation, the gas stream is passed through the membrane having any of the various known configurations. It is recognized that a liquid stream could also be filtered/purified by altering the membrane in a manner known to those skilled in the art. The heterogeneous particles are removed by filtration through the small pores of the membrane. At the same time, active sites react with the trace homogeneous impurities (e.g., oxygen, moisture or organic compounds) keeping the impurity molecules bound to the active sites. Although applicant is not bound by any theory, it is thought that substantially all of the impurity molecules come in contact with the metal molecules of the reactive layer, react, and are removed from the gas being purified. Once purification is complete and all of the reduced metal oxidized and consumed, the membrane can be regenerated by heating the substrate to greater than about 500° C. in an inert atmosphere (e.g., nitrogen) to reduce the oxidized metal wherein the carbon layer functions as a reducing agent. This regeneration can be done over and over again. The regeneration capability is a significant advantage over known filtration/purification which typically can be used only once and for which there are apparently no known means of regeneration.

The present invention is further illustrated by the following examples.

EXAMPLE 1

A Membralox ® α-alumina coated with a monolayer of γ-alumina ceramic substrate available from Alcoa and having a pore size of about 500 Å is degassed at about 400° C. under a nitrogen atmosphere to remove any impurities in the substrate. Several monolayers of carbon are deposited on the ceramic substrate by the disproportionation of carbon monoxide using a gas mixture of 10 percent by volume CO, 2% percent by volume $CO_2$ and 88 percent by volume $N_2$. The layers of carbon substantially entirely cover the surface area of the ceramic substrate to reduce the pore size thereof to about 50 Å. Lithium hydroxide is vaporized at a temperature of about 300° C. and the lithium gas is passed through the carbon coated ceramic substrate. This deposits a uniform layer of lithium metal in the oxidized form. An active group is formed between the carbon and lithium by heating the ceramic substrate layer in nitrogen gas to about 380° C. to about 400° C. The lithium exists in the C-Li form which is highly reactive with many impurities.

EXAMPLE 2

The steps of Example 1 are repeated except potassium hydroxide is used in place of lithium hydroxide.

EXAMPLE 3

The Membralox ® substrate is used and prepared the same as in Example 1 except that the deposition of the active metal on the carbon-coated ceramic membrane is accomplished by solution impregnation instead of CVD. This involves passing a dilute solution of manganese oxalate through the membrane. The membrane is then dried by purging it with nitrogen at about 110° C. for about 10 hours. A layer of metal compound is thus deposited on the carbon coated membrane. The activation of the sites and production of the reduced metal sites follow the same procedure as that of Example 1.

In the specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A reactive membrane for removal of homogeneous and heterogeneous impurities from gases, the reactive membrane comprising:
   (a) a porous ceramic or porous carbon substrate layer having a plurality of pores therein;
   (b) at least one layer of carbon deposited on the substrate layer and coating the pores thereof; and
   (c) at least one reactive layer of a metal in reduced form selected from the group consisting of manganese and alkali metals, said reactive layer formed by depositing the metal in an oxidized form on the carbon layer and heating to produce the metal in reduced form having none or less than stoichiometric amount of oxygen, and wherein said metal in reduced form is capable of reacting with impurities and removing them from gases and is chemically bonded to the carbon layer.

2. A membrane according to claim 1 wherein the layer of carbon is a monolayer having a thickness of about 20 Å to about 100 Å and coats substantially entirely the surface area of the ceramic substrate layer and the pores thereof.

3. A membrane according to claim 1 wherein the substrate layer has an initial pore size of about 500 Å.

4. A membrane according to claim 1 wherein the membrane has a-reduced pore size of about 50 Å to about 200 Å.

5. A membrane according to claim 1 wherein the alkali metal is selected from the group consisting of lithium, sodium and potassium.

6. A membrane according to claim 1 wherein the porous ceramic substrate layer is an α-alumina layer coated with a layer of γ-alumina.

7. A method for forming a reactive membrane for removing homogeneous and heterogeneous impurities from gases, said method comprising:
   (a) forming at least one layer of carbon on substantially the entire surface area of a porous ceramic or porous carbon substrate layer having a plurality of pores; and
   (b) chemically bonding a reactive layer of a metal in reduced form selected from the group consisting of manganese and alkali metals to the layer of carbon to form a reactive membrane.

8. A method according to claim 7 wherein the forming of at least one layer of carbon of step (a) comprises disproportionating carbon monoxide to carbon while in contact with the substrate layer.

9. A method according to claim 7 wherein step (b) includes forming a vapor from a hydroxide or oxide of the metal.

10. A method according to claim 7 wherein step (b) includes heating the porous substrate layer to greater than about 300° C. in an inert atmosphere.

* * * * *